(No Model.)
K. A. KLOSE.
CASTER.
No. 580,407.
Patented Apr. 13, 1897.
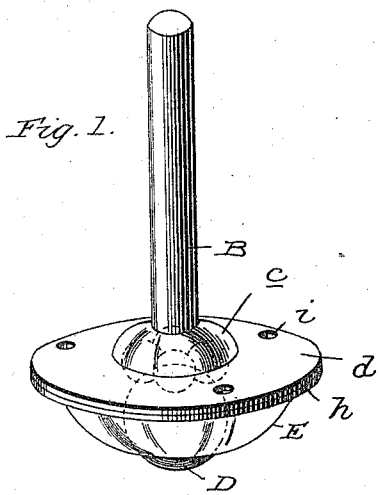
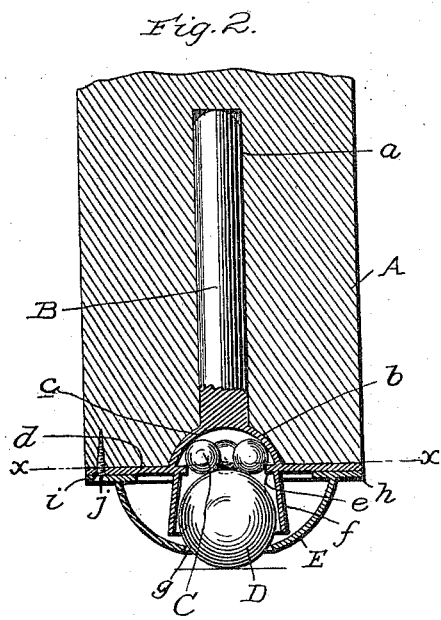
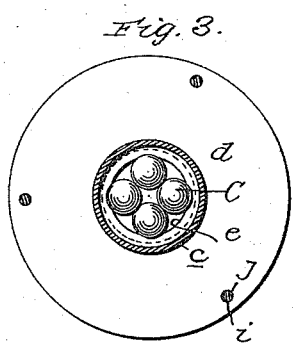
Witnesses:
Inventor
Karl A. Klose
By James J Shehy
Attorney

UNITED STATES PATENT OFFICE.

KARL AUGUST KLOSE, OF BUTTE, MONTANA, ASSIGNOR OF ONE-HALF TO WILLIAM K. SEWARD, OF SAME PLACE.

CASTER.

SPECIFICATION forming part of Letters Patent No. 580,407, dated April 13, 1897.

Application filed December 14, 1896. Serial No. 615,627. (No model.)

*To all whom it may concern:*

Be it known that I, KARL AUGUST KLOSE, a citizen of the United States, residing at Butte, in the county of Silver Bow and State of Montana, have invented certain new and useful Improvements in Casters; and I do declare the following to be a full, clear, and exact description of the invention, such as will enable others skilled in the art to which it appertains to make and use the same.

My invention relates to improvements in that class of furniture-casters which comprise a principal or large ball rolling against a plurality of small balls in a socket; and it consists in the peculiar and advantageous construction, novel combination, and adaptation of parts hereinafter described, and particularly pointed out in the claims appended.

In the accompanying drawings, Figure 1 is a perspective view of my improved caster. Fig. 2 is a vertical section, partly in elevation, illustrating the caster as connected to the leg of a piece of furniture; and Fig. 3 is a horizontal section taken in the plane indicated by the line $x$ $x$ of Fig. 2, with the small balls shown in plan.

Referring by letter to the said drawings, A indicates a leg of a piece of furniture in the lower end of which is formed a socket $a$, having the flaring and rounded mouth or lower end $b$, and B indicates the shank of my improved caster, which is arranged in the socket $a$ of the leg. This shank B is provided at its lower end with the integral cup $c$, which conforms to and is seated in the mouth $b$ of the socket $a$, and said shank is also provided at the lower edge of the cup $c$ with the integral flange $d$, which is designed to bear against the lower end of the leg A, and which extends inwardly a slight distance beyond the edge of the cup to form a ledge $e$, for a purpose presently described. Said shank or shank portion B of the caster is further provided with the integral and depending annular flange $f$, which is preferably flared slightly toward its lower end for a purpose presently pointed out.

Arranged within the cup $b$ and bearing against said cup and the inner corner of the ledge $e$, and also bearing against each other, are four (more or less) antifriction-balls C, against which bears a large ball D, which also bears upon the floor, as shown. This large ball rests and is adapted to turn within the flange $f$ of the shank portion B, and it is retained in position by the concavo-convex cap E, which has a central aperture $g$ of less diameter than the ball D, through which said ball extends, as shown.

The cap E is provided with a flange $h$, and this flange, together with the flange $d$ of the shank portion B, is provided with apertures $i$ for the passage of screws, which connect the cap E and the shank portion B, and also connect the caster to the leg A, as shown in Fig. 2.

In assembling the parts of my improved caster the small balls C are placed in the cup $c$ and the large ball D is placed within the annular flange $f$ and against the small balls, as shown, after which the cap E is placed over the large ball and connected with the shank portion B in the manner described. From this it will be seen that the parts of the caster may be quickly and easily assembled, and also that the caster may be very easily connected to the leg of a piece of furniture.

In the practical operation of the caster the small antifriction-balls C are free to move in the cup $c$ and against each other, and consequently it will be seen that the friction between the large ball D and said balls C is reduced to a minimum, and that therefore the heaviest pieces of furniture when equipped with my improved casters may be moved with comparative ease and without noise, which is an important advantage. It will also be seen that the large ball D bears against the small balls only, and that therefore there is no friction or frictional wear between said ball D and the contiguous parts of the caster.

Having described my invention, what I claim is—

1. A caster comprising the shank portion having the cup $c$, and also having the ledge $e$, extending inwardly from the edge of the cup and the annular flange $f$, depending from said ledge, the plurality of balls C, arranged within the cup $c$, and bearing against the interior of the same and the ledge $e$, and also bearing against each other; said balls C, being free to race or move around upon the ledge $e$, and the large ball D, arranged within the flange $f$, of the shank portion and bearing against the balls C, substantially as and for the purpose set forth.

2. The herein-described caster comprising the shank portion B, formed in one piece and having the cup $c$, the outwardly-extending flange $d$, at the lower edge of the cup, the inwardly-extending ledge $e$, at the lower edge of the cup, and the annular flange $f$, depending from the ledge $e$, the plurality of balls C, arranged within the cup $c$, and bearing against the interior of the same and the ledge $e$; said balls C, being free to race or move around upon the ledge $e$, the large ball D, arranged within the flange $f$, of the shank portion and bearing against the balls C, the concavo-convex cap E, having the central aperture $g$, receiving the ball D, and also having the flange $h$, resting against the flange $d$, of the shank portion, and means for connecting the flanges of cap and shank portion, substantially as specified.

In testimony whereof I affix my signature in presence of two witnesses.

KARL AUGUST KLOSE.

Witnesses:
C. H. RAEDER,
T. E. TURPIN.